United States Patent
Bachhuber et al.

(10) Patent No.: US 6,310,537 B1
(45) Date of Patent: *Oct. 30, 2001

(54) SYSTEM WITH OPTICAL OR RADIO REMOTE CONTROL FOR CLOSING MOTOR VEHICLES

(75) Inventors: Anton Bachhuber, Langquaid; Maximilian Kern, Freiherr-v.-Stein-Strasse; Christian Schneider, Regensburg, all of (DE)

(73) Assignee: Siemens Aktiegesellschaft

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1054 days.

(21) Appl. No.: 08/760,922

(22) Filed: Dec. 6, 1996

Related U.S. Application Data

(62) Continuation of application No. 08/519,625, filed on Aug. 25, 1995, now abandoned, which is a continuation of application No. 08/078,178, filed as application No. PCT/EP92/00537 on Mar. 3, 1992, now abandoned.

(30) Foreign Application Priority Data

Mar. 7, 1991 (DE) .................................................. 91103519

(51) Int. Cl.[7] .................................................. H04Q 1/00
(52) U.S. Cl. .................................. 340/5.23; 340/825.22; 307/10.1
(58) Field of Search .................. 340/825.31, 825.34, 340/825.22, 531, 426, 5.23; 307/10.1, 10.2

(56) References Cited

U.S. PATENT DOCUMENTS

| | | | |
|---|---|---|---|
| 4,366,466 | * 12/1982 | Lutz | 340/825.31 |
| 4,494,114 | * 1/1985 | Kaish | 340/825.31 |
| 4,667,176 | 5/1987 | Matsuda | 307/10.1 |
| 4,754,255 | * 6/1988 | Sanders | 340/825.31 |
| 4,847,614 | 7/1989 | Keller | 340/825.31 |
| 4,888,575 | * 12/1989 | De Vaulx | 340/825.31 |
| 4,967,305 | * 10/1990 | Murrer | 340/825.31 |
| 4,990,906 | * 2/1991 | Kell | 340/825.31 |
| 5,006,843 | * 4/1991 | Hauer | 340/825.31 |
| 5,229,648 | * 7/1993 | Sues | 340/825.31 |

FOREIGN PATENT DOCUMENTS

| | | | |
|---|---|---|---|
| 8909033 | 10/1989 | (DE) . | |
| 0126402 | 11/1984 | (EP) . | |
| 0265728 | 5/1988 | (EP) . | |
| 2144249 | * 2/1985 | (GB) | 340/825.31 |

* cited by examiner

*Primary Examiner*—Brian Zimmerman
(74) *Attorney, Agent, or Firm*—Schiff Hardin & Waite

(57) ABSTRACT

The broadcast code (I) is received by the receiver (E) fitted in the motor vehicle, which receiver (E) controls the relevant lock or the relevant locks—after a comparison of the received code (I) with digits stored in the receiver (E) and correlating with the code (I) or with the series of codes (I). The code (I) is initialized as a permanent code or interchangeable code at least on the occasions when the motor vehicle is first used and, possibly when changes are later made to the code (I), is reinitialized. For (re)initialization, the receiver (E) must first be switched by a signal to its (re)initialization readiness, before the receiver (E) can be (re)initialized. The motor vehicle has a diagnostic interface (D) for the electrical testing of motor vehicle units. The receiver (E) is only switched to its (re)initialization readiness by a signal fed to it (E) via the diagnostic interface (D).

16 Claims, 1 Drawing Sheet

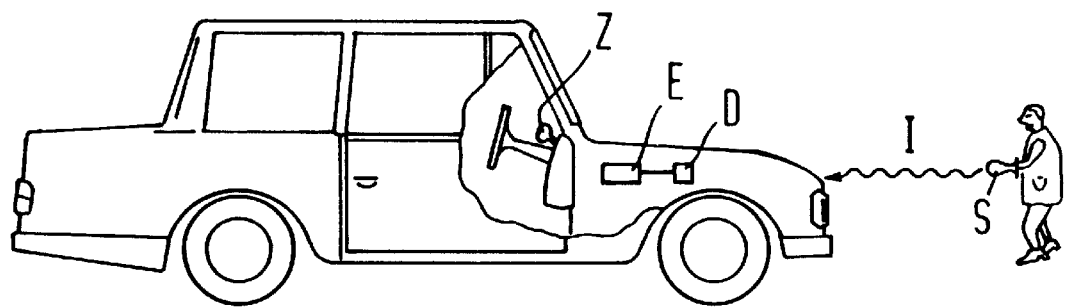

SYSTEM WITH OPTICAL OR RADIO REMOTE CONTROL FOR CLOSING MOTOR VEHICLES

This is a continuation, of application Ser. No. 08/519,625 filed Aug. 25, 1995, now abandoned, which is a continuation of Ser. No. 08/078,178 filed Jun. 17, 1993, which is a 371 of PCT/EP92/00537 filed Mar. 3, 1992, now abandoned.

BACKGROUND OF THE INVENTION

The present invention is related to a system with optical or radio remote control for locking and unlocking motor vehicles. Such systems are disclosed, for example, in pending application U.S. Ser. No. 773,635, filed Nov. 8, 1991.

This known system for locking and unlocking motor vehicles is an example of a so-called unidirectional system, in which namely the (re)initialization is carried out without dialog between the transmitter and the receiver. The invention was admittedly developed initially for this known unidirectional system for locking and unlocking motor vehicles. However, it is not restricted just to unidirectional locking and unlocking systems, and not at all to just that specific known unidirectional system for locking and unlocking motor vehicles, but can also be used in the case of bidirectional systems, in which a more or less extensive dialog takes place.

One problem in the case of such initializable systems for locking and unlocking motor vehicles is that unallowed and unintended (re)initializations are to be reliably avoided as far as possible. The invention therefore relates in particular to corresponding technical prerequisites for creating the initialization readiness of the system for locking and unlocking motor vehicles.

In addition, it is known per se to install a diagnostic interface in a motor vehicle, namely for example a special connector fitted in the engine compartment. By means of this diagnostic interface, the state of electronic and/or mechanical motor vehicle units can be tested or interrogated, for example the current engine characteristics, the state of the brakes and the serviceability of a wide variety of other electronic units such as airbag-control units and ABS characteristics—as a rule only in appropriately equipped authorized workshops.

SUMMARY OF THE INVENTION

It is an object of the present invention to prevent unallowed and unintended (re)initializations as far as possible by using appropriate technical precautionary measures to enable as far as possible only authorized experts in workshops to (re)initialize the system for locking and unlocking motor vehicles.

The object of the present invention is achieved by a system with optical or radio remote control for locking and/or unlocking motor vehicles, in which the transmitter corresponding to the key broadcasts a digital code (in the case of a permanent code always the same code, in the case of an interchangeable code a code from a series of codes) upon actuation by a user for unlocking and possibly also for locking. This broadcast code is received by the receiver in the motor vehicle. The receiver controls the relevant lock or locks after a comparison of the received code with digits stored in the receiver and correlating with the code or with the series of codes. The code is initialized as a permanent code or interchangeable code at least on the occasions when the motor vehicle is first used and, possibly when changes are later made to the code, is reinitialized. That is the code is fixed for the following actuations by storing in the receiver digits correlating with the code, possibly also by additionally storing in the transmitter digits correlating with the code. For (re)initialization, that is for initialization and/or for reinitialization, the receiver must first be switched by a signal to its (re)initialization readiness before the receiver can be (re)initialized. The motor vehicle has a diagnostic interface for the electrical testing of motor vehicle units, and the receiver can only be switched to its (re)initialization readiness by a signal fed to it via the diagnostic interface.

The invention thus prevents unallowed and unintended (re)initializations by a (re)initialization only being possible if an appropriate signal is supplied—generally only by an authorized workshop—via the diagnostic interface to the receiver.

The following describe additional technical precautionary measures further hinder unallowed and unintended (re) initialization or facilitate authorized (re)initialization. In a further embodiment the receiver can only be switched to its (re)initialization readiness by inserting into the associated lock and turning a mechanical key individually assigned to the motor vehicle, that is for example the ignition key and/or a mechanical door key additionally fitted to the transmitter. This ensures that the (re)initializing person is additionally in possession of the relevant key which is individually assigned to this motor vehicle.

In another embodiment the receiver is only switched to its (re)initialization readiness by a digital special code fed via the diagnostic interface. This prevents unauthorized persons who do not know and cannot create the special code from being able to initiate (re)initialization readiness simply by a different type of signal fed to the receiver via the diagnostic interface. It also prevents initiated inadvertently by an unauthorized person, as well as, by an authorized person simply by a different type of signal being fed to the receiver via the diagnostic interface.

In yet a further embodiment the receiver both can initially only be switched to its (re)initialization readiness by a signal of short duration via the diagnostic interface, and subsequently remains for a predetermined period of time of longer duration in its (re)initialization readiness. This makes it easier for the receiver, which has been triggered by the short signal, lasting for example far less than 1 second, to be satisfactorily (re)initialized without undue haste during the following, for example, four minutes.

In another embodiment the receiver is switched to its (re)initialization readiness by turning the ignition key inserted in the ignition lock into a position in which it engages without the motor running. This prevents the system for closing motor vehicles being able to be (re)initialized without possession of the correct ignition key and without knowledge of the correct actuation of this ignition key, and preventing ignition when the engine is running adversely affecting (re)initialization.

In a further embodiment for (re)initialization, the receiver is additionally only switched to its (re)initialization readiness by a transmitter signal broadcast by the transmitter. This prevents the system for locking and unlocking motor vehicles being able to be (re)initialized without possession of the correct door key, with optical or radio control, and without knowledge of the correct way of actuating this ignition key.

The transmitter signal additionally contains a sequence of digits which fixes the code valid for following actuations, or the series of codes valid for following actuations. This makes (re)initialization easier for the authorized person by said authorized person then no longer having to actuate the transmitter in an appropriate way several times in succession at relatively large time intervals.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

This FIGURE shows an example of a system for locking and unlocking motor vehicles with optical, that is for example infrared, or radio remote control, which is to be (re)initialized.

DESCRIPTION OF THE PREFERRED EMBODIMENT

In the case of this system, the transmitter S corresponding to the key broadcasts a digital code I as soon as the user actuates it for unlocking—possibly also for locking—the doors and possibly also the trunk and the engine hood. In the case of the invention, in fact any code I can be used for this purpose. Thus, it may, for example, be a permanent code I, which always remains unchanged from actuation to actuation. However, it may also be an interchangeable code, by the code I being changed from actuation to actuation in accordance with certain rules or algorithms individually assigned to the relevant system for locking and unlocking motor vehicles;—then the broadcast code I is a code from a series of such codes I which all permit opening of the doors etc.

This code I broadcast by the actuated transmitter S is received by the receiver E fitted in the motor vehicle. The receiver E unlocks (or locks) the relevant lock or the relevant locks after a comparison of the received code I with digits which are stored beforehand in the receiver E and must correlate with the code I—or with the series of codes I.

The code I is to be clearly distinguishable with certainty from motor vehicle to motor vehicle, this code—or the relevant series of codes I—having to be assigned to the relevant motor vehicle as a permanent code or interchangeable code at least on the occasions when the motor vehicle is first used. Later, the code assignment may have to be subsequently changed again one or more times, for example if an additional key is obtained for a further motor vehicle user or if a key has been lost and the finder could make unauthorized use of the motor vehicle. This first, initial assignment of a code—or of a series of codes—is known as initialization, and the later, subsequent reassignment is known as (re)initialization. The assignment or reassignment is thus performed by a (re)initialization, by on the one hand digits stored in the transmitter S and on the other hand digits stored in the receiver E being matched up with one another, or by corresponding new storings of digits being carried out in the receiver E—possibly also in the transmitter S—the digits stored in the transmitter S and in the receiver E correlating with one another—in a different way according to the specific type of system for locking and unlocking motor vehicles, even if according to rules typical for this.

The receiver E is normally not in the state in which it is ready for (re)initialization, but only in the state in which it is ready for receiving the code I serving for unlocking and/or locking. For (re)initialization, the receiver E first of all has to be switched by a special signal to its (re)initialization readiness.

As mentioned, it is a problem in the case of such initializable systems for locking and unlocking motor vehicles that unallowed and unintended (re)initializations are to be reliably avoided as far as possible. The invention relates in particular to technical prerequisites for hindering unwanted and unauthorized creation of the initialization readiness of the system for locking and unlocking motor vehicles. The invention achieves this object of avoiding unallowed and unintended (re)initializations as far as possible by using appropriate technical precautionary measures to enable as far as possible only authorized experts in workshops to (re)initialize the system for locking and unlocking motor vehicles:

In the case of the invention, for this purpose use is made of the diagnostic interface D, which is customary in many motor vehicles and in fact can only be operated satisfactorily in authorized workshops, otherwise in fact, as is known, generally serves only for the electrical testing of motor vehicle units and, in the case of the invention, is connected—directly or indirectly—to the receiver E. According to the invention, the receiver E is namely only switched to its (re)initialization readiness by a special signal fed to this receiver E via the diagnostic interface D. Thus, unallowed and unintended (re)initializations are avoided according to the invention by using appropriate technical conditions, which can scarcely be met by chance (!), to enable as far as possible only authorized experts in workshops who are versed with the specific technique to (re) initialize the system for locking and unlocking motor vehicles, to be precise as far as possible only when they fully intend to do so. Thus, any chance (re)initialization by these experts is avoided, for example during any motor vehicle repairs, even during any tests on motor vehicle equipment by means of the diagnostic interface D, by (re)initialization only being possible if an appropriate certain signal is supplied to the receiver E via the diagnostic interface D.

In order in addition to improve further the protection against unallowed or unintended (re)initialization, it may be additionally provided that the (re)initializing person must, as it were, additionally prove first of all to the receiver E that he is authorized for (re)initialization. For this purpose, it may be additionally provided that the receiver E can only be switched to its (re)initialization readiness by a further signal, which is mainly initiated by the additional inserting and turning of a mechanical key, individually assigned to the motor vehicle, that is for example by inserting and turning the ignition key Z into the position "radio" or into another position, and/or for example by inserting and turning a mechanical door key, additionally fitted on the transmitter S, into the associated lock—that is for example into the door lock or ignition lock. Thus, for this purpose, the (re) initializing person does not only need the correct key, he must also use this key in a special manner for the purpose.

In order in addition to prevent unauthorized persons who do not know and cannot create the special code from being able to feed to the receiver E via the diagnostic interface D a signal which can be created relatively easily by chance (!) and which initiates (re)initialization readiness, and to prevent—even an authorized person—inadvertently initiating (re)initialization readiness via the diagnostic interface D by a signal comprising relatively simple elements, it may be provided that only a signal which can scarcely ever be created by chance, comprising more complicated elements, which is fed to the receiver via the diagnostic interface D initiates (re)initialization readiness: for this purpose, the receiver E can namely be dimensioned in such a way that it can only be switched to its (re)initialization readiness by a digital special code fed via the diagnostic interface (D). Those undesired chance occurrences are then avoided to the greatest extent.

In order in addition to make it easier for the receiver E, triggered by a short signal, for example lasting far less than 1 second, to be able to be satisfactorily (re)initialized without undue haste during the following period of time, for example lasting 4 minutes, the receiver E may be designed in such a way that it additionally both can initially only be switched to its (re)initialization readiness by a signal of short duration via the diagnostic interface D, and subsequently remains for a predetermined period of time of longer duration in its (re)initialization readiness.

In order in addition to prevent the closing system for motor vehicles being able to be (re)initialized without possession of the correct ignition key and without knowledge of the correct actuation of this ignition key, and in order in addition to prevent the ignition or the associated disturbing high-frequency emissions when the engine is running from adversely affecting (re)initialization, it may be additionally provided that the receiver E can only be switched to its (re)initialization readiness by turning the ignition key Z inserted in the ignition lock into a position in which it engages and in which the engine however is not running.

In order in addition to prevent the system for locking and unlocking motor vehicles being able to be (re)initialized without possession of the correct door key, with optical or radio control, and without knowledge of the correct way of actuating this ignition key, it may furthermore be provided that, for (re)initialization, the receiver E additionally can only be switched to its (re)initialization readiness by a special transmitter signal I broadcast by the transmitter S. For this purpose, this transmitter signal I may be, for example, a special code I which is broadcast only for the preparation of (re)initialization and which is, for example, initiated by the (re)initializing person only by a quite special way of operating pushbuttons fitted on the key S.

In order in addition to make (re)initialization easier for the authorized person, in that he then no longer has to actuate the transmitter S in an appropriate way several times in succession during (re)initialization, that special transmitter signal I may additionally contain a sequence of digits which for its part already checks now the code I valid for later actuations—or the series of codes I valid for later actuations.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A system with optical or radio remote control for initializing a system for locking and/or unlocking doors of motor vehicles, comprising:
    a portable transmitter corresponding to a key for a motor vehicle, said transmitter broadcasting a digital code upon actuation by a user for locking and/or unlocking doors of the motor vehicle;
        said broadcast digital code received by a receiver in the motor vehicle, which receiver controls a relevant lock or locks of the doors of the motor vehicle after a comparison and correlation of the received digital code with a predetermined code stored in the receiver;
    the digital code being initialized as the predetermined code at least when the motor vehicle is first used and, possibly when changes are later made to the digital code, being reinitialized, that is fixed for following actuations, by storing in the receiver the broadcast digital code as a new predetermined code that replaces a previous predetermined code, the broadcast digital code being also storable in the transmitter;
    an external diagnostic device for supplying at least an external signal for (re)initialization, that is for initialization and/or for (re)initialization, the receiver being switched only after reception of the external signal to a (re)initialization readiness status before the receiver is (re)initialized;
    the motor vehicle having a diagnostic interface for electrical testing of motor vehicle units in the motor vehicle, said diagnostic interface connected to said receiver; and
    the receiver being switchable to the (re)initialization readiness status only after reception of the external signal fed to the receiver via the diagnostic interface from the external diagnostic device;
        wherein a new code signal is generated using the transmitter and is transmitted to the receiver, the new code signal then being stored as a new-predetermined code signal in the receiver.

2. The system as claimed in claim 1, wherein said external signal has a short duration and wherein the receiver remains for a predetermined period of time of longer duration in its (re)initialization readiness status.

3. The system as claimed in claim 1, wherein said digital code is a single permanent code that is broadcast each time the transmitter is activated.

4. The system as claimed in claim 1, wherein said digital code is a changeable code that is modified according to a predetermined algorithm after every activation of the transmitter thereby producing a series of digital codes, and wherein the receiver has means for modifying the predetermined code according to the algorithm after every reception of a broadcast digital code.

5. A system with optical or radio remote control for initializing a system for locking and/or unlocking doors of motor vehicles, comprising:
    a portable transmitter corresponding to a key for a motor vehicle, said transmitter broadcasting a digital code upon actuation by a user for locking and/or unlocking doors of the motor vehicle;
        said broadcast digital code received by a receiver in the motor vehicle, which receiver controls a relevant lock or locks of the doors of the motor vehicle after a comparison and correlation of the received digital code with a predetermined code stored in the receiver;
    the digital code being initialized as the predetermined code at least when the motor vehicle is first used and, possibly when changes are later made to the digital code, being reinitialized, that is fixed for following actuations, by storing in the receiver the broadcast digital code as a new predetermined code that replaces a previous predetermined code, the broadcast digital code being also storable in the transmitter;
    an external diagnostic device at least an external signal for (re)initialization, that is for initialization and/or for reinitialization, the receiver being switched only after reception of the external signal to a (re)initialization readiness status before the receiver is (re)initialized;

the motor vehicle having a diagnostic interface for electrical testing of motor vehicle units in the motor vehicle, said diagnostic interface connected to said receiver; and the receiver being switchable to the (re)initialization readiness status only after reception of the external signal fed to the receiver via the diagnostic interface from the external diagnostic device and by a further signal fed to the receiver, the further signal being generated by inserting into an associated lock and turning a mechanical key individually assigned to the motor vehicle;

wherein a new code signal is generated using the transmitter and is transmitted to the receiver, the new code signal then being stored as a new predetermined code signal in the receiver.

6. The system as claimed in claim 5, wherein the associated lock is an ignition lock of the motor vehicle and the mechanical key is an ignition key and wherein the receiver is switchable to its (re)initialization readiness status by turning the ignition key inserted in the ignition lock of the motor vehicle into a position in which the ignition key engages without a motor of the motor vehicle running.

7. The system as claimed in claim 5, wherein said mechanical key is at least one of an ignition key of the motor vehicle and a mechanical door key of the motor vehicle.

8. The system as claimed in claim 5, wherein said external signal has a short duration and wherein the receiver remains for a predetermined period of time of longer duration in its (re)initialization readiness status.

9. The system as claimed in claim 5, wherein said digital code is a single permanent code that is broadcast each time the transmitter is activated.

10. The system as claimed in claim 5, wherein said digital code is a changeable code that is modified according to a predetermined algorithm after every activation of the transmitter thereby producing a series of digital codes, and wherein the receiver has means for modifying the predetermined code according to the algorithm after every reception of a broadcast digital code.

11. A system with optical or radio remote control for initializing a system for locking and/or unlocking doors of motor vehicles, comprising:

a transmitter corresponding to a key for a motor vehicle, said transmitter broadcasting a digital code upon actuation by a user for locking and/or unlocking doors of the motor vehicle;

said broadcast digital code received by a receiver in the motor vehicle, which receiver controls a relevant lock or locks of the doors of the motor vehicle after a comparison and correlation of the received digital code with a predetermined code stored in the receiver;

the digital code being initialized as the predetermined code at least when the motor vehicle is first used and, possibly when changes are later made to the digital code, being reinitialized, that is fixed for following actuations, by storing in the receiver the broadcast digital code as a new predetermined code that replaces a previous predetermined code, the broadcast digital code being also storable in the transmitter;

an external diagnostic device for supplying at least an external signal for (re)initialization, that is for initialization and/or for reinitialization, the receiver being switched only after reception of the external signal to a (re)initialization readiness status before the receiver is (re)initialized;

the motor vehicle having a diagnostic interface for electrical testing of motor vehicle units in the motor vehicle, said diagnostic interface connected to said receiver; and the receiver being switchable to the (re)initialization readiness status only after reception of the external signal fed to the receiver via the diagnostic interface from said external diagnostic device and by a further signal fed to the receiver, the further signal being generated in response to the digital code broadcast by the transmitter;

wherein a new code signal is generated using the transmitter and is transmitted to the receiver, the new code signal then being stored as a new predetermined code signal in the receiver.

12. The system as claimed in claim 11, wherein the digital code is one of a fixed code broadcast by the transmitter and a changeable code broadcast by the transmitter according to a predetermined algorithm.

13. The system as claimed in claim 11, wherein said external signal has a short duration and wherein the receiver remains for a predetermined period of time of longer duration in its (re)initialization readiness status.

14. The system as claimed in claim 11, wherein said digital code is a single permanent code that is broadcast each time the transmitter is activated.

15. The system as claimed in claim 11, wherein said digital code is a changeable code that is modified according to a predetermined algorithm after every activation of the transmitter thereby producing a series of digital codes, and wherein the receiver has means for modifying the predetermined code according to the algorithm after every reception of a broadcast digital code.

16. A method, using optical or radio remote control for initializing a system for locking and/or unlocking doors of motor vehicles, comprising:

broadcasting, using a portable transmitter corresponding to a key for a motor vehicle, a digital code upon actuation by a user for locking and/or unlocking doors of the motor vehicle;

receiving said broadcast digital code by a receiver in the motor vehicle, which receiver controls a relevant lock or locks of the doors of the motor vehicle after a comparison and correlation of the received digital code with a predetermined code stored in the receiver;

initializing the digital code as the predetermined code at least when the motor vehicle is first used and, possibly when changes are later made to the digital code, reinitializing the digital code, that is fixed for following actuations, by storing in the receiver the broadcast digital code as a new predetermined code that replaces a previous predetermined code, the broadcast digital code being also storable in the transmitter;

supplying, using an external diagnostic device, at least an external signal for (re)initialization, that is for initialization and/or for (re)initialization, the receiver being switched only after reception of the external signal to a (re)initialization readiness status before the receiver is (re)initialized;

providing in the motor vehicle a diagnostic interface for electrical testing of motor vehicle units in the motor vehicle, said diagnostic interface connected to said receiver; and switching the receiver to the (re)initialization readiness status only after reception of the external signal fed to the receiver via the diagnostic interface from the external diagnostic device;

wherein a new code signal is generated using the transmitter and is transmitted to the receiver, the new code signal then being stored as a new-predetermined code signal in the receiver.

* * * * *